(12) United States Patent
Lee

(10) Patent No.: US 11,537,215 B2
(45) Date of Patent: Dec. 27, 2022

(54) AMBIENT LIGHT SENSING DEVICE AND METHOD, AND INTERACTIVE DEVICE USING SAME

(71) Applicant: PixArt Imaging Incorporation, HsinChu (TW)

(72) Inventor: Chuan-Hsin Lee, Hsinchu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 0 days.

(21) Appl. No.: 17/852,283

(22) Filed: Jun. 28, 2022

(65) Prior Publication Data
US 2022/0326785 A1 Oct. 13, 2022

Related U.S. Application Data

(63) Continuation of application No. 15/856,042, filed on Dec. 27, 2017, now Pat. No. 11,402,926, which is a continuation of application No. 13/931,878, filed on Jun. 29, 2013, now abandoned.

(30) Foreign Application Priority Data

Aug. 1, 2012 (TW) .................. 101127676

(51) Int. Cl.
*H04N 5/235* (2006.01)
*G06F 3/03* (2006.01)
*G06V 10/60* (2022.01)

(52) U.S. Cl.
CPC ............ *G06F 3/0304* (2013.01); *G06V 10/60* (2022.01)

(58) Field of Classification Search
CPC .................................................. H04N 5/2351
See application file for complete search history.

(56) References Cited

U.S. PATENT DOCUMENTS

2013/0328771 A1* 12/2013 Lin .................. H04N 7/183
345/158
2013/0342636 A1* 12/2013 Tian .................. G06T 7/269
348/14.08

* cited by examiner

*Primary Examiner* — Dennis P Joseph
(74) *Attorney, Agent, or Firm* — Tung & Associates

(57) ABSTRACT

The invention provides an ambient light sensing device which receives at least one visible light image sensed by an image sensor. The ambient light sensing device includes an image sampling unit and an analyzing unit. The image sampling unit divides the visible light image into plural image blocks, extracts at least one sample data in each image block, and generates a comparison data according to a difference between the sample data extracted at different time points. The analyzing unit analyzes the comparison data and generates an output analysis signal accordingly.

21 Claims, 5 Drawing Sheets

AMBIENT LIGHT SENSING DEVICE AND METHOD, AND INTERACTIVE DEVICE USING SAME

CROSS REFERENCE

This is a Continuation of U.S. application Ser. No. 15/856,042, filed on Dec. 27, 2017, which is a continuation of Ser. No. 13/931,878 filed on Jun. 29, 2013.

BACKGROUND OF THE INVENTION

Field of Invention

The present invention relates to an ambient light sensing device and method, especially an ambient light sensing device and method which divide a visible light image into plural image blocks and respectively sample and analyze data in the image blocks to generate an output analysis signal. An interactive device using the ambient light sensing device is also provided by the present invention.

Description of Related Art

An ambient light sensor is used for sensing ambient light and analyzing the status of the ambient light. In order to simulate the effect of human eyes in response to light of visible wavelength, the ambient light sensor usually includes a film coating, a digital to analog converter, and a power amplifier, etc. A proximity sensor also senses light, but its function is to detect a distance. The proximity sensor usually includes an infrared light source; the infrared light source projects light, and the proximity sensor receives light reflected from an object to determine a distance from the object. An interactive device is often equipped with various different kinds of sensing devices according to different requirements. FIG. 1 shows an interactive device 10 which is for example a mobile phone, a personal digital assistance (PDA), or a laptop computer. Such interactive device 10 usually includes a camera function and therefore the figure shows an image sensing device 11 which is included within the interactive device 10. Besides the image sensing device 11, other sensing devices 12, 13, and 14 can be included for different functions, such as a proximity sensor and/or an ambient light sensor for sensing a specific spectrum.

However, to equip multiple sensing devices in an interactive device, especially the proximity sensor which requires an additional infrared light source, increases the cost, power consumption and complexity. Furthermore, when the interactive device is a portable electronic device, it will be more convenient if the portable electronic device can be controlled by more ways (for example, shaking the portable electronic device to input a command) but does not require additional components to increase its complexity, which will make the interactive device more competitive.

Therefore, it is desired to provide an interactive device with reduced cost, power consumption and complexity, and more ways of control.

SUMMARY OF THE INVENTION

The present invention provides an ambient light sensing device and method, and an interactive device using the ambient light sensing device, which can reduce the cost and complexity and provide more ways of control.

According to the above and other objectives, the present invention provides an ambient light sensing device for receiving a visible light image generated from an image sensor. The ambient light sensing device includes an image sampling unit and an analyzing unit. The image sampling unit divides the visible light image into plural image blocks, extracts at least one sample data in each image block, and generates a comparison data according to a difference between the sample data extracted at different time points. The analyzing unit analyzes the comparison data and generates an output analysis signal.

The present invention also provides an interactive device, which includes: an image sensor, for providing a camera function for the interactive device to generate an image according to ambient light; and an ambient light sensing device, for extracting at least one sample data in the image, generating a comparison data according to a difference between the sample data extracted at different time points, and analyzing the comparison data to generate an output analysis signal accordingly.

The present invention also provides a method of sensing ambient light, which includes: obtaining an image according to ambient light by an image sensor provided in an interactive device for a camera function; extracting at least one sample data in the image; generating a comparison data according to a difference between the sample data extracted at different time points; and analyzing the comparison data to generate an output analysis signal accordingly.

In a preferable embodiment of the present invention, the visible light image is divided into plural image blocks of a uniform size or of sizes in proportion to one another.

In a preferable embodiment of the present invention, the visible light image includes plural pixel data and each pixel data includes plural sub-pixel data. The sample data is generated according to brightness, color temperature, contrast, image pattern, a number or shape of a group of pixels having a predefined color or meeting a predefined condition, or a number or shape of a group of sub-pixels having a predefined color or meeting a predefined condition. The sub-pixels having a predefined color for example are green sub-pixels.

In a preferable embodiment of the present invention, the output analysis signal is generated according to the comparison data and a status of the interactive device. The output analysis signal includes one or more of the followings: a flip signal, a proximity signal, an ambient brightness signal, a gesture signal, a device motion signal, and a device shake signal.

In a preferable embodiment of the present invention, a function of the interactive device can be performed according to the output analysis signal.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale. The orientation such as: up, down, left, or right is for reference to the drawings only.

The ambient light sensing device of the present invention can be used in various interactive devices such as a touch pad, a touch panel, a mobile phone, a personal digital assistant (PDA), a laptop computer, a tablet computer, or the like.

Figure 1:
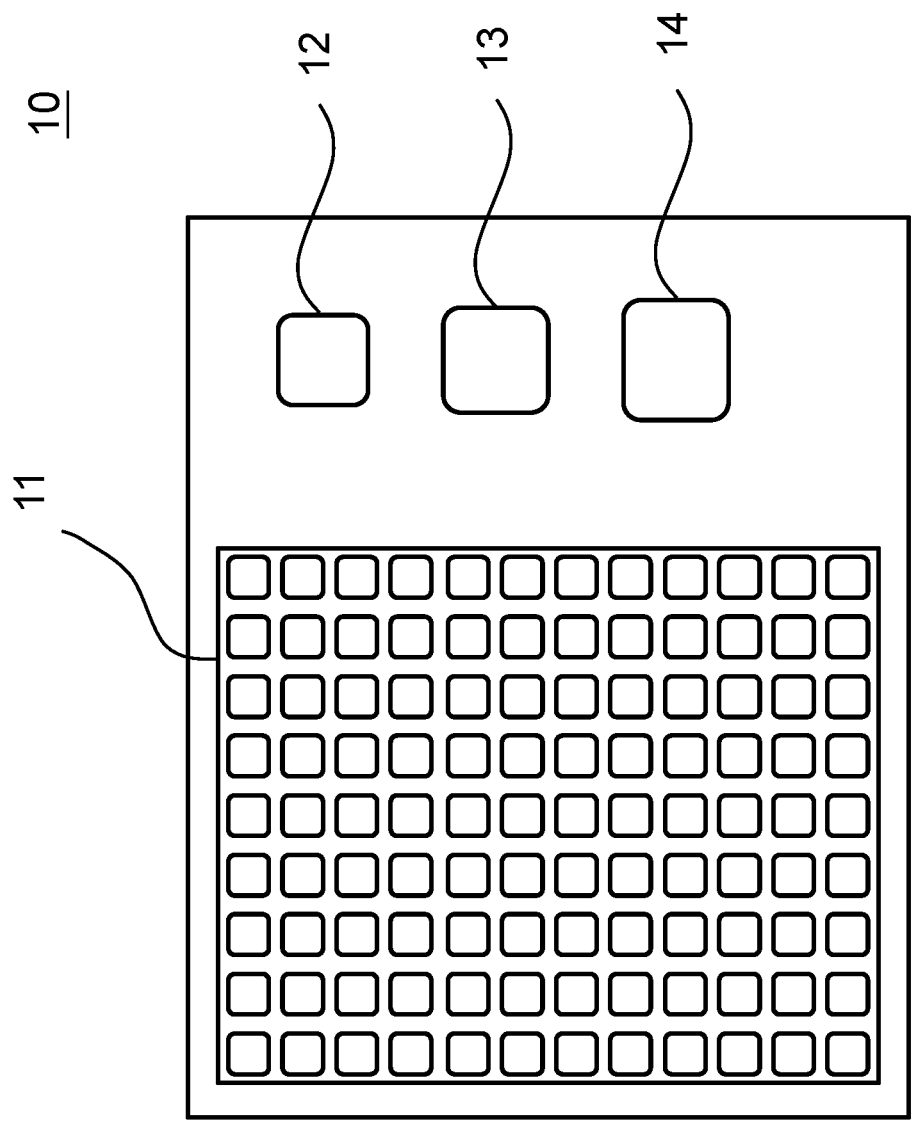
FIG. 1 shows a prior art interactive device.
Figure 2A:
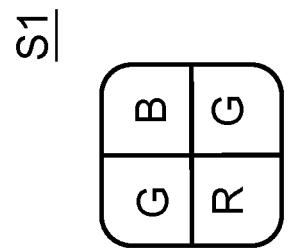
FIG. 2A shows a preferable embodiment of the pixel sensing unit according to the present invention.
Figure 2:
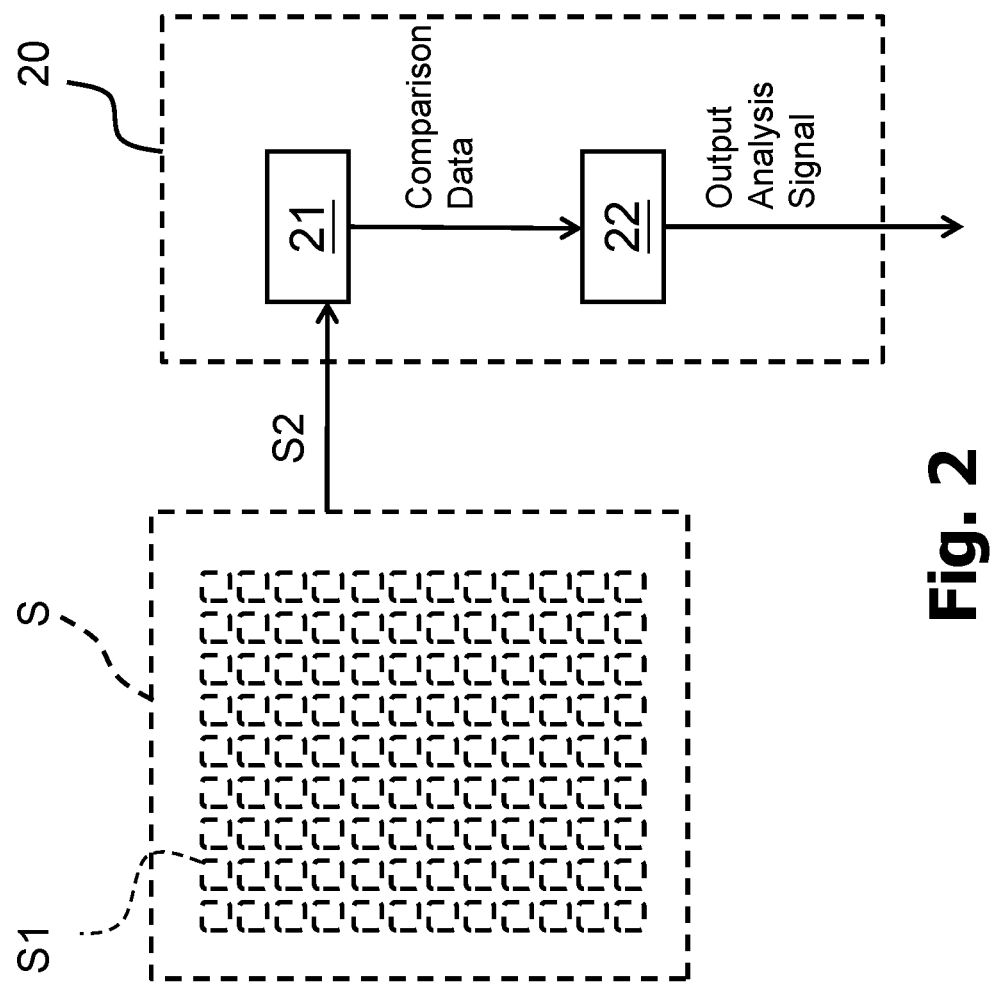
FIG. 2 shows a preferable embodiment of the ambient light sensing device according to the present invention.

FIG. 2 shows an embodiment of the ambient light sensing device 20 of the present invention, which receives at least one image generated from an image sensor S. The ambient light sensing device 20 and the image sensor S can be integrated in an interactive device; or, if the interactive device has already been equipped with an image sensor, the ambient light sensing device 20 can make use of the image generated from the image sensor S and the interactive device does not need to incorporate another sensor. Currently many portable electronic devices (such as the aforementioned mobile phone, personal digital assistant (PDA), laptop computer, tablet computer, etc.) have already been equipped with an image sensor, and the present invention therefore has the advantages of lower cost and less circuit complexity than the prior art ambient light sensing device because the present invention does not require a dedicated sensor(s) for sensing ambient light and/or proximity detection.

In this embodiment, the ambient light sensing device 20 includes an image sampling unit 21 and an analyzing unit 22. If the image sensor S is a sensor already provided in the interactive device, then the image sensor S is usually for providing a camera function (photo taking or video recording) and it generates visible light image (however the present invention is not limited to this; the image sensor S also can be one which generates invisible light image such as infrared image). The image sampling unit 21 divides the visible light image (S2, FIG. 3) into plural image blocks (S2B1, FIG. 3), extracts at least one sample data in each image block, and generates a comparison data according to a difference between the received sample data at different time points. The analyzing unit analyzes the comparison data and generates an output analysis signal.

Referring to FIG. 2, the image sensor S includes plural pixel sensing units S1 (the number of pixel sensing units S1 shown in the figure is only an example; the number of pixel sensing units S1 can be modified as desired). When the image sensor S is for sensing visible light, referring to FIG. 2A, each of the pixel sensing units can include three kinds of sub-pixels (red R, green G, and blue B), to respectively receive the corresponding red sub-pixel information, green sub-pixel information, and blue sub-pixel information from the received visible light. In one embodiment, because the green sub-pixel information is more closer to what human eyes sense, the analysis of the ambient light brightness can be based on the green sub-pixel information. However, the present invention is not limited to this; the pixel sensing unit S1 can include other kinds of sub-pixels such as CMYK (Cyan, Magenta, Yellow, Black), or the RGB sub-pixels can be arranged in a different way from the one shown in figure. The analysis of the ambient light brightness can be based on other sub-pixel information, or can be calculated by an average of a group of pixels or sub-pixels, and each pixel or sub-pixel in the group can be given the same or different weightings.

Figure 3A:
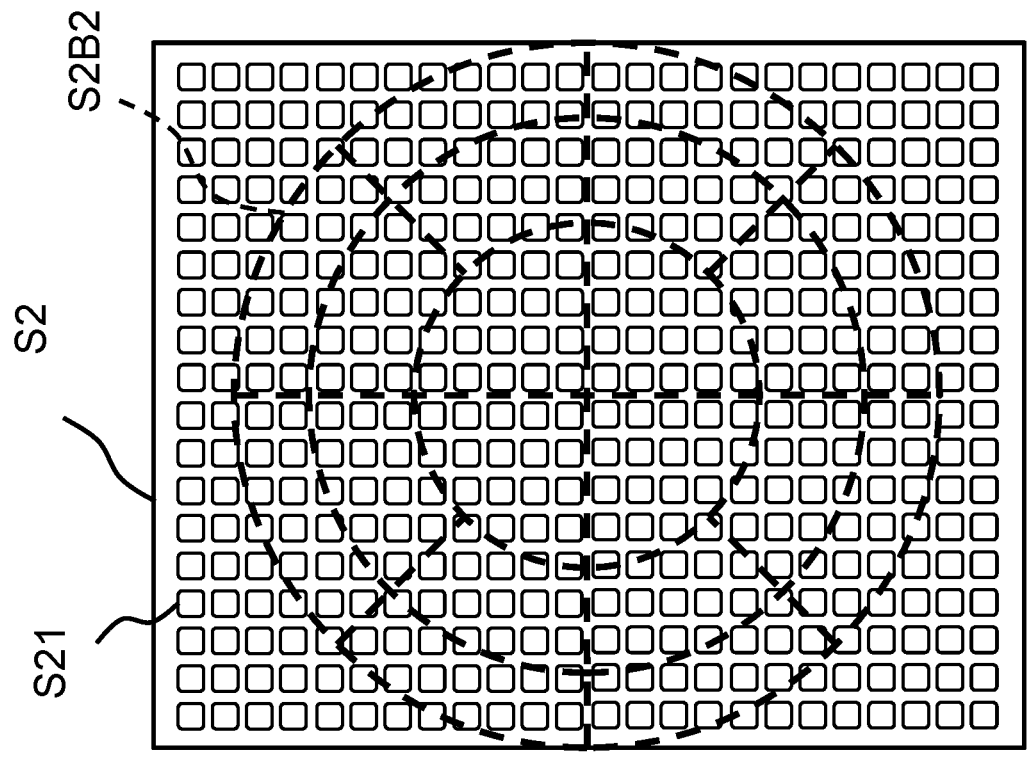
FIG. 3A shows another preferable embodiment of dividing image blocks according to the present invention.
Figure 3:
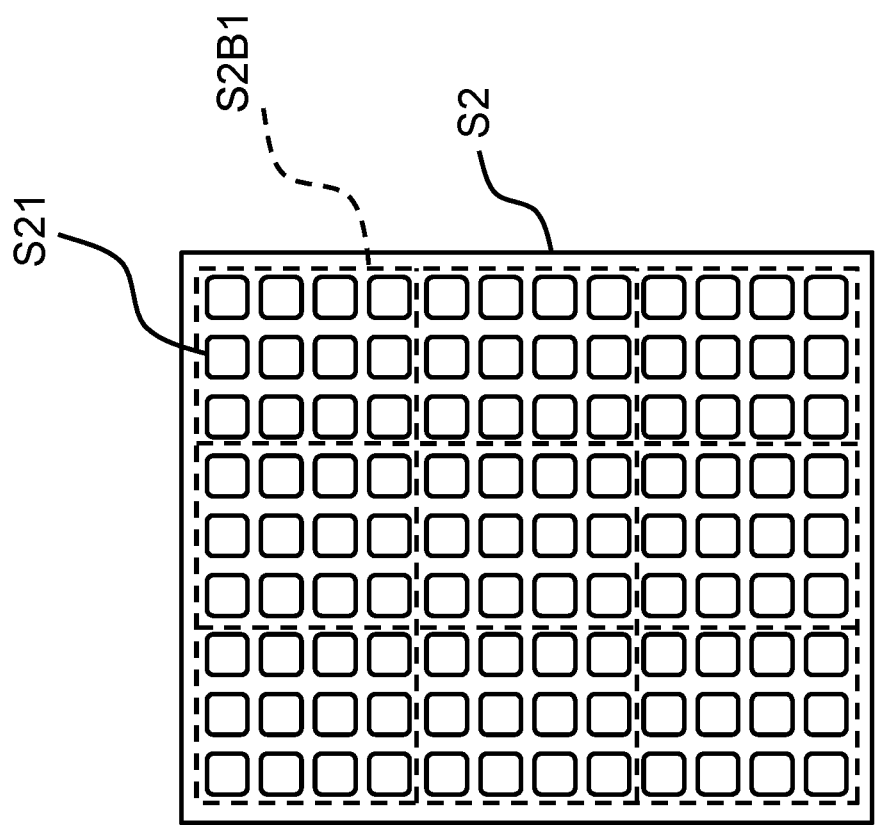
FIG. 3 shows a preferable embodiment of dividing image blocks according to the present invention.

Referring to FIG. 3, a preferable embodiment of dividing the image S2 into plural image blocks is shown. The visible light image S2 is generated from the image sensor S, and the visible light image S2 includes plural pixels S21. The image sampling unit 21 divides the visible light image S2 into plural image blocks S2B1. In this embodiment the visible light image S2 is evenly divided into plural image blocks S2B1, that is, each image block S2B1 has the same size. However, the present invention is not limited to this; as shown in FIG. 3A, for example, the visible light image S2 can be divided into plural image blocks S2B1 having different sizes and the size of an image block S2B1 is proportional to its radial location. This is because an image captured by a lens may have a different imaging effect at different radial locations, so the image blocks S2B1 may have different sizes to cope with such different imaging effects. The image sampling unit 21 can adjust sample data from different image blocks S2B2 in a different way; or the analyzing unit 22 can analyze comparison data from different image blocks S2B2 by different criteria, so that different image blocks S2B2 are processed by different basis to reduce errors.

The sample data for example can be a center value, an average value, a gravity value, a highest value, etc. of an image block, as a representing value of the image block. The comparison data can be a function based on an operation of a previous sample data and a later sample data, wherein a simplest example is a difference between sample data extracted at different time points. The "value" for calculation can be brightness or other parameters that can be obtained.

In one embodiment of the ambient light sensing device 20 according to the present invention, the analyzing unit 22 analyzes the sample data and generates an output analysis signal. Or in another embodiment, besides the sample data, the analyzing unit 22 can refer to other information (for example but not limited to an operating status, time, gravity status, acceleration, or angular velocity of the interactive device) and generate the output analysis signal. The output analysis signal may include one or more of the followings: a flip signal, a proximity signal, an ambient brightness signal, a gesture signal, a device motion signal, and a device shake signal, wherein which of the above is the output analysis signal can be decided with reference to the status of the interactive device. In detail, the flip signal indicates whether the interactive device equipped with the ambient light sensing device 20 flips or not. The proximity signal indicates whether an object is nearby the interactive device. The ambient brightness signal represents a sensing result on ambient light brightness. The gesture signal indicates whether a user makes a specific gesture toward or with reference to the interactive device. The device motion signal indicates a moving direction and/or displacement of the interactive device. The device shaking signal indicates whether the interactive device is shaking. All of these signals can provide a user with information or provide the user with possible ways to control the interactive device.

furthermore specifically, the analyzing unit 22 receives the comparison data from the image sampling unit 21 and determines whether the dynamic range of the comparison data changes or not, such as changing from a bright range to a dark range or vice versa, wherein the threshold between the bright range and dark range can be set according to implementation needs. For example, when the interactive device is a mobile phone or a tablet computer, and the analyzing unit 22 analyzes the comparison data for a purpose to judge whether the mobile phone or tablet computer flips or not (i.e., the output analysis signal is the flip signal), because the mobile phone may not be completely shaded when it flips while the tablet computer can be better shaded than the mobile phone, the threshold of the dark range for determining whether the mobile phone is flipped should be less stringent than the tablet computer. For another example, if the interactive device is a mobile phone, and the analyzing unit 22 analyzes the comparison data for a purpose to determine whether the mobile phone flips or closes to a human ear (i.e., the output analysis signal is a flip signal or a proximity signal), because the mobile is not completely shaded and is less shaded as it flips, the threshold of dark range for determining whether the mobile phone closes to a human ear should be less stringent than the threshold of dark range for determining whether the mobile phone flips. Therefore, the threshold setting for dark and bright ranges should depend on the implementation needs. In addition, the requirement of the sensitivity to the dark range is usually higher than the requirement of the sensitivity to the bright range, so in one embodiment, the bright and dark ranges can be scaled by a logarithmic function.

Figure 4:
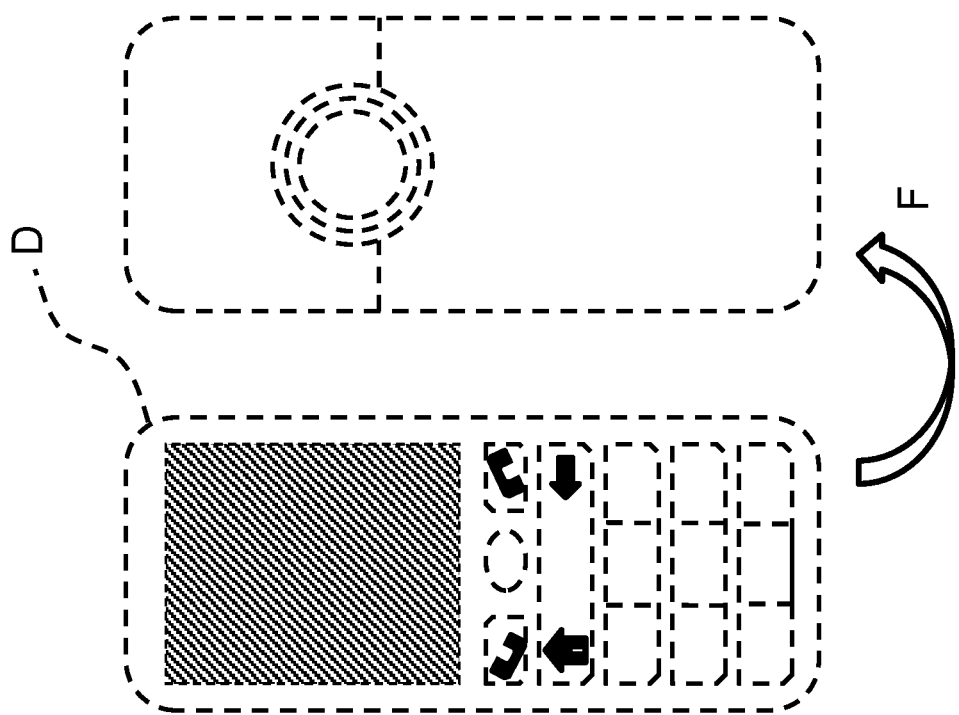
FIG. 4 shows a preferable embodiment of the flip operation of the device.

An example of how the output analysis signal generated by the analyzing unit 22 can help a user to control the interactive device is now described. Referring to FIG. 4, FIG. 4 shows that the interactive device D flips along a direction F. The analyzing unit 22 judges whether the comparison data indicates a status change from a bright range to a dark range, and it also refers to other information (such as time: whether the sample data stays in the dark range for more than a predetermined period of time, or operating status: the position status or the currently operating function of the interactive device D), to generate an output analysis signal corresponding to the status of the interactive device D; in this embodiment, the output analysis signal for example can be the flip signal, the proximity signal, or the ambient brightness signal.

More specifically, when the interactive device is a mobile phone and its operating status is ringing, the output analysis signal for example can be a flip signal and this for example means that the user intends to change the ringtone to silent mode or the user refuses to answer the call. When the mobile phone is in a conversation mode, the output analysis signal for example can be a proximity signal indicating whether the user's face is closing to the mobile phone or not. If the user's face is closing to the mobile phone, the brightness of the display can be decreased or the display can be shut down to save unnecessary power consumption. For another example, when the display is functioning, the output analysis signal can be an ambient light signal indicating the ambient brightness, and the brightness of the display can be adjusted according to the ambient light signal; for example, the brightness of the display can be decreased in high brightness environment to save power consumption, and the brightness of the display can be increased in low brightness environment for better display effect.

It is preferable but not necessary for the output analysis signal to be generated in correlation to the operating status. The output analysis signal can be generated by the analyzing unit 22 independent of the operating status of the interactive device D.

The judgment in the aforementioned embodiments is based on brightness; however, the sample data needs not be related to the brightness of the whole image or the block. In another embodiment, the image sampling unit 21 can extract at least one image index in the visible light image to be the sample data, and the image sampling unit 21 can generate a comparison data according to the difference between the sample data extracted at different time points. The image index can be generated according to one or more of: color temperature, contrast, image pattern, a number or shape of a group of pixels having a predefined color or meeting a predefined condition, or a number or shape of a group of sub-pixels having a predefined color or meeting a predefined condition, and the aforementioned brightness. Basically, the image index can be generated by calculating one or plural representative pixels/sub-pixels in the whole or a part of the image with any suitable method, and the calculation result can be the sample data. The comparison data can be generated from the image indices, and the analyzing unit 22 can generate the output analysis signal according to the comparison data, for example according to methods described in the above embodiments.

Figure 5:
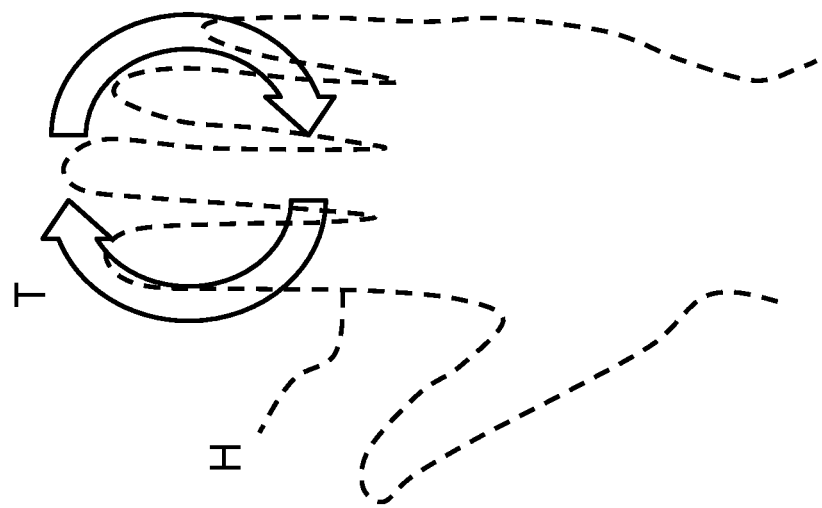
FIG. 5 shows a preferable embodiment of operating the device by a gesture.

FIG. 5 shows an embodiment of operating the device by a gesture, wherein a hand H and a predetermined gesture T are shown. When the hand H moves in a visible region of the image sensor S, the image extracted by the image sensor S will change, and thus the image index will change accordingly. The analyzing unit 22 judges whether or not the motion vector or the trajectory is in compliance with the predetermined gesture T, and in this case the output analysis signal generated according to the analysis result can be a gesture signal. For example, assuming that a circular gesture represents a command to set the mobile phone to silent mode, when the hand H operates a circular gesture in front of the image sensor S, the analyzing unit 22 determines the gesture to conform to the predetermined circular gesture according to the comparison data (the correlation between plural sample data, in this embodiment, the comparison data is the trajectory formed by plural image indices), and generates a corresponding output analysis signal (gesture signal in this embodiment); in response, the mobile phone switches off the ringtone to silent mode according to the output analysis signal. The above is only an illustrative example and the gesture can be defined as any other command not limited to setting the mobile phone to silent mode, such as pulling out a phonebook list or locking the touch screen to prevent from mistouch, etc.

Figure 6:
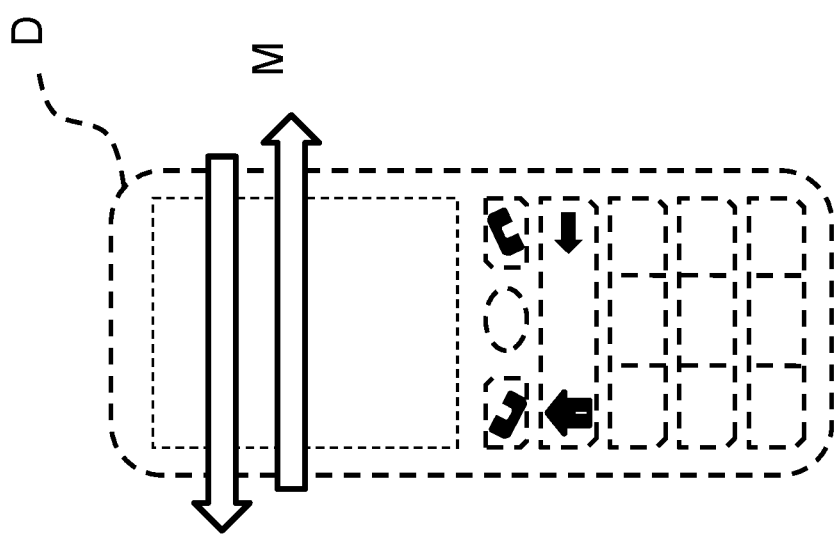
FIG. 6 shows a preferable embodiment of operating the device by a motion.

FIG. 6 shows an embodiment of operating the device by motion, wherein an interactive device D and a motion M are shown. When the interactive device D moves, the image extracted by the image sensor S will change, and the image index will change accordingly. The analyzing unit 22 determines whether or not the motion vector or trajectory is in compliance with a predefined motion, and in this case the output analysis signal generated according to the analysis result can be a device motion signal. When the device moves in a specific direction (such as but not limited to one of the directions shown in FIG. 6), the image extracted by the image sensor in the interactive device D will move in a direction opposite to the device motion; thus, the analyzing unit 22 can generate a corresponding device motion signal. The device motion signal can be used to represent a command such as switching page, activating camera, or triggering a specific function, etc., which can be defined as desired. Both the device motion signal and the gesture signal are generated according to a change between the image indices; the device motion signal is generated according to the motion of the interactive device D, while the gesture signal is generated according to a object motion in the extracted image. If the interactive device has been equipped with another sensor capable of distinguishing whether the interactive device D is moving, such as a gravity sensor, an acceleration sensor, a gyro-sensor, etc., the analyzing unit 22 can determine whether it is the interactive device D or the object in the extracted image that is moving by referring to information provided by this other sensor, to thereby determine whether the output analysis signal is a device motion signal or a gesture signal. However, if the interactive device D does not provide such information, the present invention can still function properly, and it is only required to set the motion vector or trajectory of the image indices of the gesture signal and that of the device motion signal differently so that one is distinguishable from the other.

Figure 7:
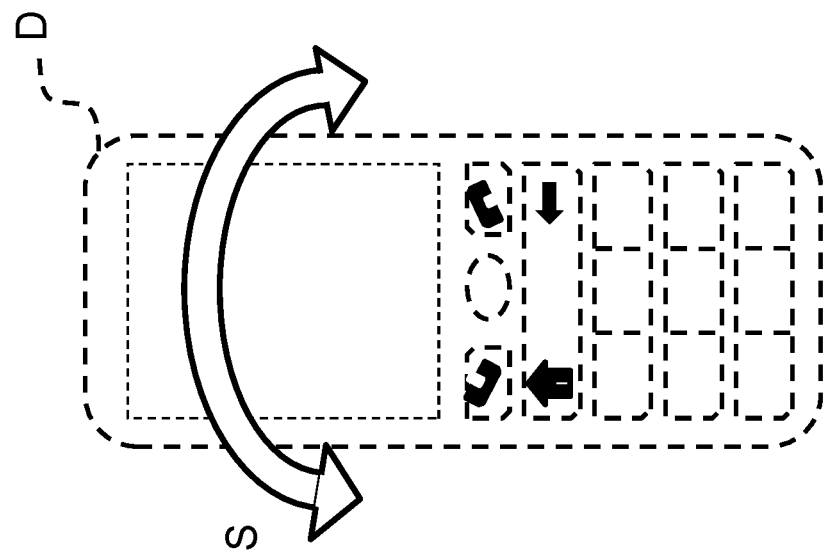
FIG. 7 shows a preferable embodiment of operating the device by shaking.

FIG. 7 shows an embodiment of operating a device by shaking, wherein the interactive device D and a shaking motion S of the interactive device D are shown. The wording "shake" means that the interactive device D rotates with respect to a plane. The analyzing unit 22 determines whether the motion vector or trajectory of the image indices conforms to a predefined device shaking motion, and in this case the output analysis signal generated according to the analysis result can be a device shaking signal. When the interactive device D shakes, the image index extracted in the image sensor S forms a trajectory moving in a direction opposite to the direction of the interactive device; thus, the analyzing unit 22 can determine whether to generate the device shaking signal accordingly, or the analyzing unit 22 can refer to other information provided from the interactive device D to assist its judgment. The device shaking signal can be used to represent a command such as switching page, activating camera, displaying a predefined alphabet or text, triggering a specific function, etc., which can be defined as desired. Similar to the aforementioned embodiment, the device shaking signal, the device motion signal, and the gesture signal are all generated according to a chang between the image indices, and all of them relate to or are affected by the motion of the interactive device D. If the interactive device D can provide other information to assist judging whether the interactive device D moves, the analyzing unit 22 can refer to such information for better determining whether the output analysis signal is a device shaking signal, a device motion signal, or a gesture signal. However, if the interactive device does not provide such information, the present invention can still function properly, and it is only required to set the motion vector or trajectory of these signals differently so that one is distinguishable from the rest.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the exposure time of the image sensor as it captures an image may affect the analysis of the analyzing unit as it analyzes the comparison data, so the exposure time is preferably set in a proper range, or the analysis can be correlated to the exposure time. For another example, when a low resolution image sensor is used, the number of samples taken from an image is preferably more than a case where a high resolution image sensor is used, so that the analysis is more accurate. The present invention is not limited to the application in a mobile phone; it can be applied to any other kind of portable electronic device or a larger size electronic device. An embodiment or a claim of the present invention does not need to achieve all the objectives or advantages of the present invention. The title and abstract are provided for assisting searches but not for limiting the scope of the present invention.

What is claimed is:

1. An ambient light sensing device for receiving at least one visible light image sensed by an image sensor installed within a portable electronic device, wherein the image sensor provides both a photo taking or video recording function and an ambient light sensing function, whereby the photo taking or video recording function and the ambient light sensing function generate separated results, wherein the photo taking or video recording function records an image or a video for a user to see, and the ambient light sensing function senses ambient light condition for electronic processing to generate a corresponding action, so that the generated separated results are expressed to the user in separate and different forms, one form being a form of an image or a video and another form being an action which is different from the image or video, the ambient light sensing device comprising:
   an image sampling unit, for
      obtaining the at least one visible light image from the image sensor,
      dividing the visible light image into a plurality of image blocks,
      extracting at least one sample data in each image block, and
      comparing the sample data extracted at different time points of the same image block to generate a comparison data according to a difference between the sample data extracted at different time points; and
   an analyzing unit, for analyzing the comparison data and generating an output analysis signal accordingly, wherein the output analysis signal includes an ambient brightness signal representing a sensing result of ambient light brightness, the ambient brightness signal being provided to the portable electronic device to be processed by the portable electronic device for generating ambient brightness information such that the portable electronic device is not equipped with a dedicated sensor which is only for sensing ambient light,
   wherein the sample data includes at least one green sub-pixel data, and the image sampling unit generates the comparison data according to the green sub-pixel data whereby the ambient brightness signal which is a separated result from the photo taking or video recording function is obtained solely according to the green sub-pixel data.

2. The ambient light sensing device of claim 1, wherein the visible light image is divided into the plurality of image blocks of a uniform size or of sizes in proportion to one another.

3. The ambient light sensing device of claim 1, wherein the sample data is generated according to brightness.

4. The ambient light sensing device of claim 1, wherein the visible light image includes a plurality of pixel data and each pixel data includes a plurality of sub-pixel data, and the sample data is generated according to brightness, color temperature, contrast, image pattern, a number or shape of a group of pixels having a predefined color or meeting a predefined condition, or a number or shape of a group of sub-pixels having a predefined color or meeting a predefined condition.

5. The ambient light sensing device of claim 1, wherein the ambient light sensing device is disposed in an interactive device and the analyzing unit generates the output analysis signal according to the comparison data and a status of the interactive device.

6. The ambient light sensing device of claim 1, wherein the image blocks are of two or more different sizes.

7. The ambient light sensing device of claim 1, wherein the image blocks have different sizes wherein the sizes of the image blocks are proportional to the radial locations of the image blocks.

8. The ambient light sensing device of claim 1, wherein the sample data is a center value, an average value, a gravity value, or a highest value of an image block.

9. An interactive device, comprising:
an image sensor, for providing a photo taking or video recording function for the interactive device, and also for providing an ambient light sensing function to generate an image according to ambient light, whereby the photo taking or video recording function and the ambient light sensing function generate separated results, wherein the photo taking or video recording function records an image or a video for a user to see, and the ambient light sensing function senses ambient light condition for electronic processing to generate a corresponding action, so that the generated separated results are expressed to the user in separate and different forms, one form being a form of an image or a video and another form being an action which is different from the image or video; and
an ambient light sensing device, for
obtaining the image from the image sensor,
dividing the image into a plurality of image blocks,
extracting at least one sample data in the image,
generating a comparison data according to a difference between the sample data extracted at different time points, and
analyzing the comparison data to generate an output analysis signal accordingly, wherein the output analysis signal includes an ambient brightness signal representing a sensing result of ambient light brightness, the ambient brightness signal being provided to the interactive device to be processed by the interactive device for generating ambient brightness information such that the interactive device is not equipped with a dedicated sensor which is only for sensing ambient light,
wherein the interactive device is a portable electronic device;
wherein the sample data includes at least one green sub-pixel data, and the comparison data is generated according to the green sub-pixel data whereby the ambient brightness signal which is a separated result from the photo taking or video recording function is obtained solely according to the green sub-pixel data.

10. The interactive device of claim 9, wherein the image sensor includes a plurality of pixels and each pixel includes a plurality of sub-pixels for sensing a visible light image, and wherein the sample data includes at least one sub-pixel data.

11. The interactive device of claim 9, wherein the ambient light sensing device generates the output analysis signal according to the comparison data and a status of the interactive device.

12. The interactive device of claim 9, wherein the image sensor is not a dedicated sensor only for sensing ambient light.

13. The interactive device of claim 9, wherein the image blocks are of two or more different sizes.

14. The interactive device of claim 9, wherein the image blocks have different sizes wherein the sizes of the image blocks are proportional to the radial locations of the image blocks.

15. The interactive device of claim 9, wherein the sample data is a center value, an average value, a gravity value, or a highest value of an image block.

16. A method of sensing ambient light, comprising:
obtaining an image according to ambient light by an image sensor provided in an interactive device, the image sensor being configured to provide a photo taking or video recording function for an interactive device, and also to provide an ambient light sensing function to generate the image according to ambient light, whereby the photo taking or video recording function and the ambient light sensing function generate separated results, wherein the photo taking or video recording function records an image or a video for a user to see, and the ambient light sensing function senses ambient light condition for electronic processing to generate a corresponding action, so that the generated separated results are expressed to the user in separate and different forms, one form being a form of an image or a video and another form being an action which is different from the image or video;
obtaining the image from the image sensor;
dividing the image into a plurality of image blocks;
extracting at least one sample data in the image;
comparing the sample data extracted at different time points of the same image block to generate a comparison data according to a difference between the sample data extracted at different time points; and
analyzing the comparison data to generate an output analysis signal accordingly, wherein the output analysis signal includes an ambient brightness signal representing a sensing result of ambient light brightness, the ambient brightness signal being provided to the interactive device to be processed by the interactive device for generating ambient brightness information such that the interactive device is not equipped with a dedicated sensor which is only for sensing ambient light,
wherein the interactive device is a portable electronic device;
wherein the sample data includes at least one green sub-pixel data, and the comparison data is generated according to the green sub-pixel data whereby the ambient brightness signal which is a separated result from the photo taking or video recording function is obtained solely according to the green sub-pixel data.

17. The method of claim 16, wherein the step of analyzing the comparison data to generate an output analysis signal includes:
generating the output analysis signal according to the comparison data and a status of the interactive device.

18. The method of claim 16, further comprising:
performing a function of the interactive device according to the output analysis signal.

19. The method of claim 16, wherein the image blocks are of two or more different sizes.

20. The method of claim 16, wherein the image blocks have different sizes wherein the sizes of the image blocks are proportional to the radial locations of the image blocks.

21. The method of claim 16, wherein the sample data is a center value, an average value, a gravity value, or a highest value of an image block.

* * * * *